US007492912B2

(12) United States Patent
Chung et al.

(10) Patent No.: US 7,492,912 B2
(45) Date of Patent: Feb. 17, 2009

(54) MULTI-CHANNEL SPEAKER SYSTEM AND A CONNECTION SYSTEM THEREOF

(75) Inventors: Yun Mo Chung, Sungwon apt. 708-1201, Cheongsol maeul, Geumgok-dong, Bundang-gu, Seongnam-city, Gyeonggi-do 463-718 (KR); Moon Vin Song, Yongin-si (KR)

(73) Assignees: Samsung Electronics Co., Ltd. (KR); Yun Mo Chung (KR)

( * ) Notice: Subject to any disclaimer, the term of this patent is extended or adjusted under 35 U.S.C. 154(b) by 191 days.

(21) Appl. No.: 10/554,431

(22) PCT Filed: Mar. 18, 2004

(86) PCT No.: PCT/KR2004/000593

§ 371 (c)(1), (2), (4) Date: Dec. 18, 2006

(87) PCT Pub. No.: WO2004/084584

PCT Pub. Date: Sep. 30, 2004

(65) Prior Publication Data

US 2007/0106404 A1 May 10, 2007

(30) Foreign Application Priority Data

Mar. 18, 2003 (KR) ...................... 10-2003-0016890

(51) Int. Cl.
*H04B 3/00* (2006.01)
*H04R 29/00* (2006.01)

(52) U.S. Cl. .......................................... 381/77; 381/59

(58) Field of Classification Search ................... 381/77, 381/79, 58, 59, 300, 80; 700/94
See application file for complete search history.

(56) References Cited

U.S. PATENT DOCUMENTS

| | | | | |
|---|---|---|---|---|
| 5,867,223 | A | 2/1999 | Schindler et al. | 348/552 |
| 6,603,859 | B1 * | 8/2003 | Asano | 381/59 |
| 6,859,538 | B1 * | 2/2005 | Voltz | 381/77 |
| 2003/0059057 | A1 * | 3/2003 | Cheng | 381/61 |

FOREIGN PATENT DOCUMENTS

| | | |
|---|---|---|
| KR | 97-48417 | 7/1997 |
| KR | 96-12931 | 4/2005 |

OTHER PUBLICATIONS

PCT International Search Report; PCT/KR2004/000593; Dated: Jul. 2, 2004.
Written Opinion of the International Searching Authority of Corresponding PCT Application :PCT/KR2004/000593; Dated: Jul. 2, 2004.

* cited by examiner

*Primary Examiner*—Vivian Chin
*Assistant Examiner*—Kile Blair
(74) *Attorney, Agent, or Firm*—Cantor Colburn LLP

(57) ABSTRACT

The present invention relates to a multi-channel speaker system and a wiring device thereof. The wiring device for a multi-channel speaker system according to an embodiment of the present invention comprises a serial audio signal circuit and a plurality of audio signal separating circuits. The serial audio signal circuit SAC generates a single serial digital audio signal by synthesizing the plurality of analog signals that are generated by the analog audio signal generating circuit, and outputs the same. The audio signal separating circuit receives the serial digital audio signal and separates a corresponding digital signal, and it converts the separated digital signal to an analog signal. Therefore, the plurality of speakers can be connected to the serial audio signal circuit SAC through a single series wire or at least two parallel wires.

8 Claims, 6 Drawing Sheets

MULTI-CHANNEL SPEAKER SYSTEM AND A CONNECTION SYSTEM THEREOF

BACKGROUND OF THE INVENTION (a) Field of the Invention

The present invention relates to a multi-channel speaker system and a wiring device thereof, and more particularly, to a multi-channel speaker system and a wiring device thereof that may be applied to various audio systems having multiple channels and corresponding speakers, and thereby simplifying structures of the system and increasing convenience in use.

(b) Description of the Related Art

Recently, various multi-channel audio systems have become available.

For example, multi-channel audio systems such as CD players, MP3 players, DVD players, and HDTVs that are preferred by high-end users have been widely spread within the general public.

In particular, home theater systems are becoming much more ubiquitous, because of the superior multi-channel sound effects of a multi-channel system and clear visual effects of a DVD player.

Furthermore, in such DVD player systems or higher-level media, the audio effect is very important, and such systems can make a listener feel as if they are at a live event so that such systems are rapidly spreading and replacing conventional audio systems and playback equipment.

Such audio systems, especially multi-channel audio systems such as DVD players, have a plurality of audio channels having level differences, and each speaker is connected to a main audio body through wires.

For example, a 5.1 channel speaker system including a woofer has six speakers of a front right speaker, a front left speaker, a center speaker, a woofer, a rear left speaker, and a rear right speaker. In order to acquire the maximum audio effect in the 5.1 channel speaker system, the six speakers must be effectively positioned, and in particular the rear left and right speakers must be positioned behind or beside users so that they are disposed far from the main body.

The most serious problems of such audio-speaker systems with multiple channels are as follows.

In order to set up the six speakers inside a room, as briefly shown in FIG. 1, six sets of wires are needed to connect a center speaker CS, a woofer W, a front tight speaker FR, a front left speaker FL, a rear right speaker RR, and a rear left speaker RL to audio output terminals p1, p2, p3, p4, p5, and p6, respectively, of a main audio body A that is generally disposed in a center portion of a front wall with respect to a user H such as a listener in a room R.

Because it is difficult for the user to perform such wiring of the speakers, additional costs for professional wiring may be needed, and exposure of the wires may spoil the beauty of the room. Further, because each of the speakers must be connected to a corresponding output terminal of the main audio body, confusion in wiring may occur and re-wiring is difficult and troublesome. For these reasons, wiring is a problematic factor in the set-up of a multi-channel speaker system.

In order to solve the wiring confusion problem, conventional speaker terminals are formed with different colors, but it is not easy to be fully aware of corresponding colors of the speaker terminals. Therefore, in the event of a change in the layout of a room, the original wiring may be maintained such that the optimal audio effect may not be obtained.

In particular, in wiring of the rear speakers that are disposed behind a seat (e.g. a sofa) of a user opposite to the main audio body in a user's home, it is quite difficult to hide the wires, so they are generally hidden in the floor or coupled to the ceiling.

These problems are inevitable because separate analog signals are sent to each of the speakers.

Therefore, wiring of the multi-channel speakers spoils visual aesthetics, and lengths of wires become long so that impedance of the wires increases, thereby decreasing output of the speakers and deteriorating audio effects.

SUMMARY OF THE INVENTION

It is an object of a multi-channel speaker system and a wiring device thereof according to an embodiment of the present invention to connect multi-channel speakers to an audio body by a single wire to ease wiring and to increase a sense of beauty.

In addition, the embodiment of the present invention can also provide an effect to increase performance by preventing deterioration of output power and audio effects that can be caused by changes of impedance due to a plurality of wires.

To achieve the above object, a wiring device according to an embodiment of the present invention is a wiring device of a multi-channel speaker system that operates a plurality of speakers with different sound range signal values by connecting a main audio body and the plurality of speakers comprising a serial audio signal circuit SAC; and audio signal separating circuits ADC that are provided in each of the plurality of speakers, wherein the serial audio signal circuit SAC comprises:

an analog/digital converter A/D for converting a plurality of analog signals that are generated by the main audio body to digital signals, a multi-channel control signal synthesizer SC for synthesizing the plurality of digital signals into a single digital audio signal, a clock generator CG for providing a reference clock to the synthesized digital audio signal, a digital signal synthesizer DG for synchronizing each of the digital audio signals according to the reference clock generated by the clock generator, a serial signal output member SO for converting the synchronized digital audio signal to a serial digital audio signal and outputting the serial digital audio signal, and a single wire extended from the serial signal output member SO; and wherein the audio signal separating circuit ADC comprises:

a multi-channel separator for separating a digital signal corresponding to the reference clock generated by the clock generator CG from the input serial digital audio signal; and a digital/analog converter D/A for converting the separated digital signal to an analog signal.

It is preferable that the plurality of speakers are connected to the serial signal output member SO through at least two parallel wires or a single wire.

It is also preferable that the serial audio signal circuit SAC is provided within the main audio body A, and the audio signal separating circuits ADC are provided within each of the plurality of speakers.

It is preferable that the serial audio signal circuit SAC is formed as a unit separate from the main audio body A and is mounted to the main audio body, and the audio signal separating circuits ADC are formed as a unit separate from the speakers and are mounted to the speakers.

A multi-channel speaker system according to an embodiment of the present invention comprises:

a plurality of speakers;

a main audio body with an analog audio signal generating circuit that is configured to generate a plurality of analog signals for operating the plurality of speakers;

a serial audio signal circuit configured to generate a single serial digital audio signal by synthesizing the plurality of analog signals that are generated by the analog audio signal generating circuit; and a plurality of audio signal separating circuits, a number of which corresponds to a number of the plurality of speakers, the audio signal separating circuit receiving the serial digital audio signal generated by the serial audio signal circuit and separating a corresponding digital signal, and the audio signal separating circuit converting the separated digital signal to an analog signal, wherein the serial audio signal circuit comprises an analog/digital converter for receiving the plurality of analog signals from the audio signal generating circuit and converting the analog signals respectively to digital signals, a multi-channel control signal synthesizer for synthesizing the digital signals into a single digital signal, a clock generator for providing a respective reference clock for the synthesized digital signal, a digital signal synthesizer for synchronizing each of the digital signals in response to the reference clock generated by the clock generator, and a serial signal outputting member for converting the synchronized digital signal to a serial digital audio signal, wherein the audio signal separating circuit comprises, a multi-channel separator SD for separating a digital signal corresponding to the respective speaker from the serial digital audio signal input through a wire, and a digital/analog converter for converting the separated digital signal to an analog signal.

It is preferable that the plurality of speakers are connected to the serial digital signal generator through at least two parallel wires or a single wire.

It is preferable that the serial audio signal circuit is provided within the main audio body A and the audio signal separating circuit is provided within each of the speakers.

It is also preferable that the serial audio circuit is formed as a unit separate from the main audio body and is mounted to the main audio body, and wherein the audio signal separating circuits are formed as a unit separate from the speakers and are mounted to the speakers.

DETAILED DESCRIPTION OF THE PREFERRED EMBODIMENTS

Preferred embodiments of the present invention will now be described in detail with reference to the accompanying drawings.

Figure 1:
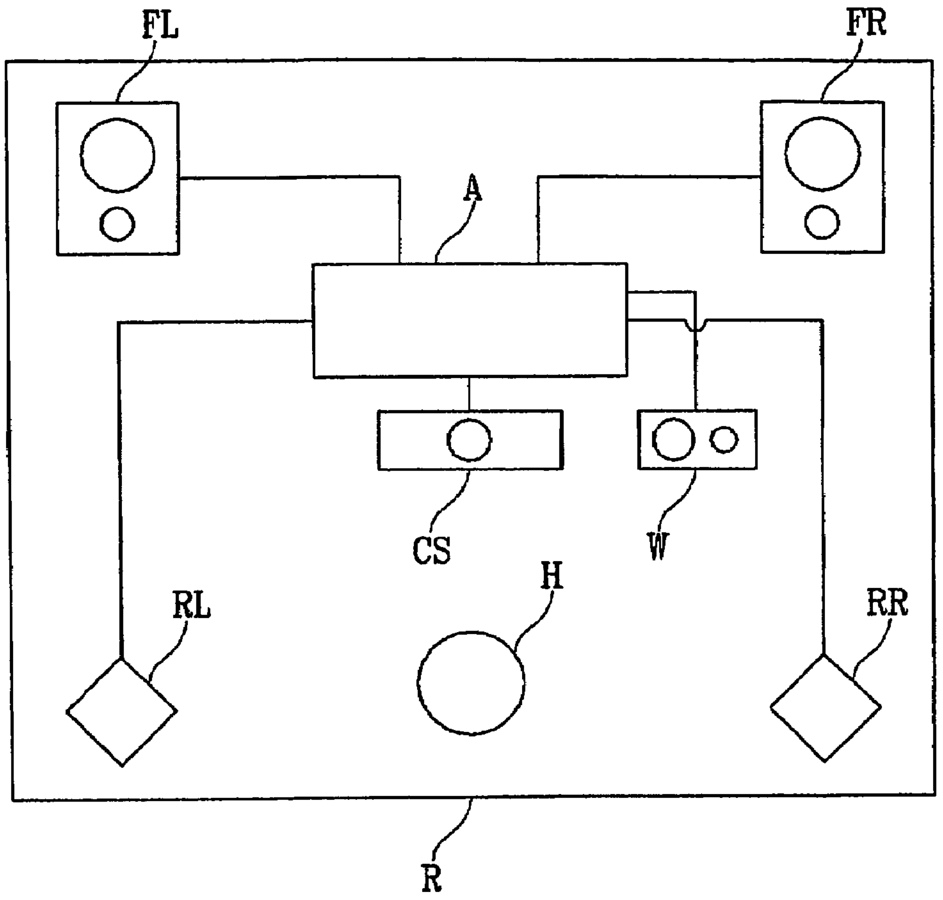
FIG. 1 is a block diagram of wiring of a conventional multi-channel speaker system.
Figure 2:
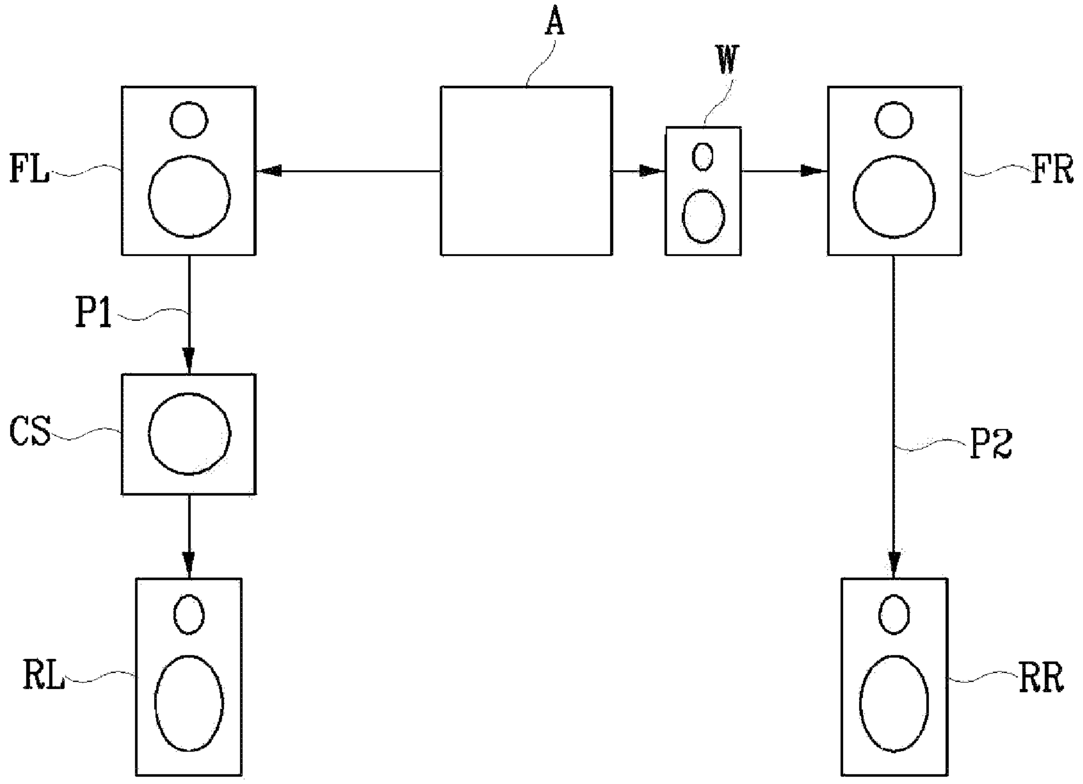
FIG. 2 is a block diagram showing a multi-channel speaker system and a wiring device thereof according to an embodiment of the present invention.
Figure 3:
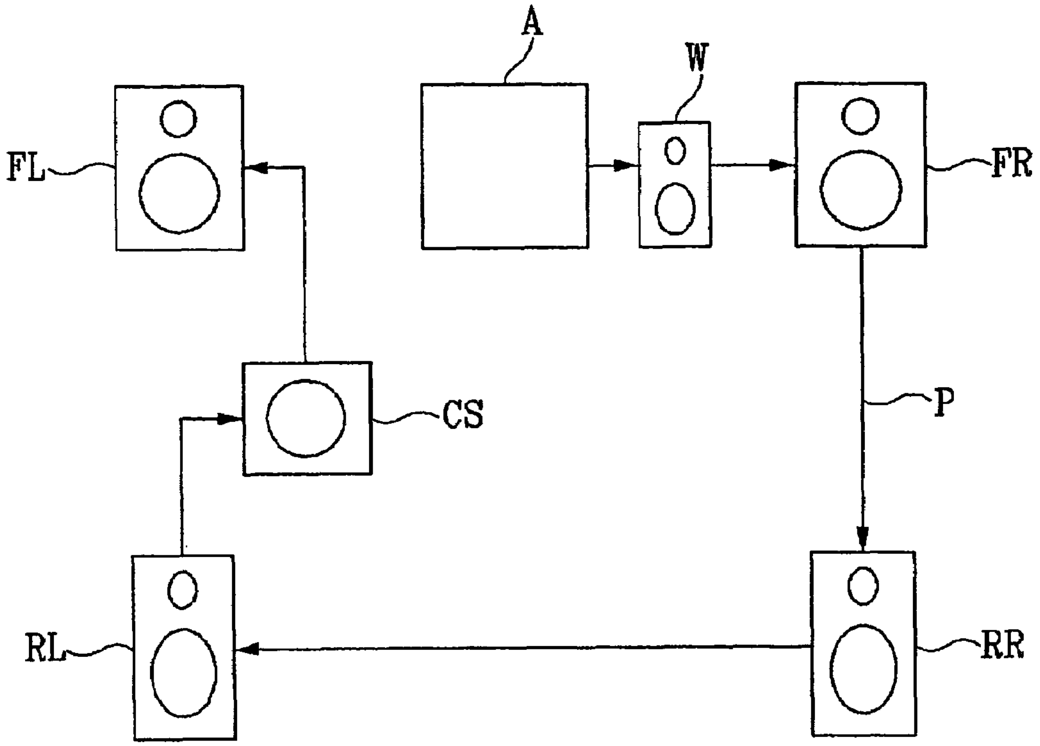
FIG. 3 is a block diagram showing another example of a multi-channel speaker system and a wiring device thereof according to an embodiment of the present invention.
Figure 4:
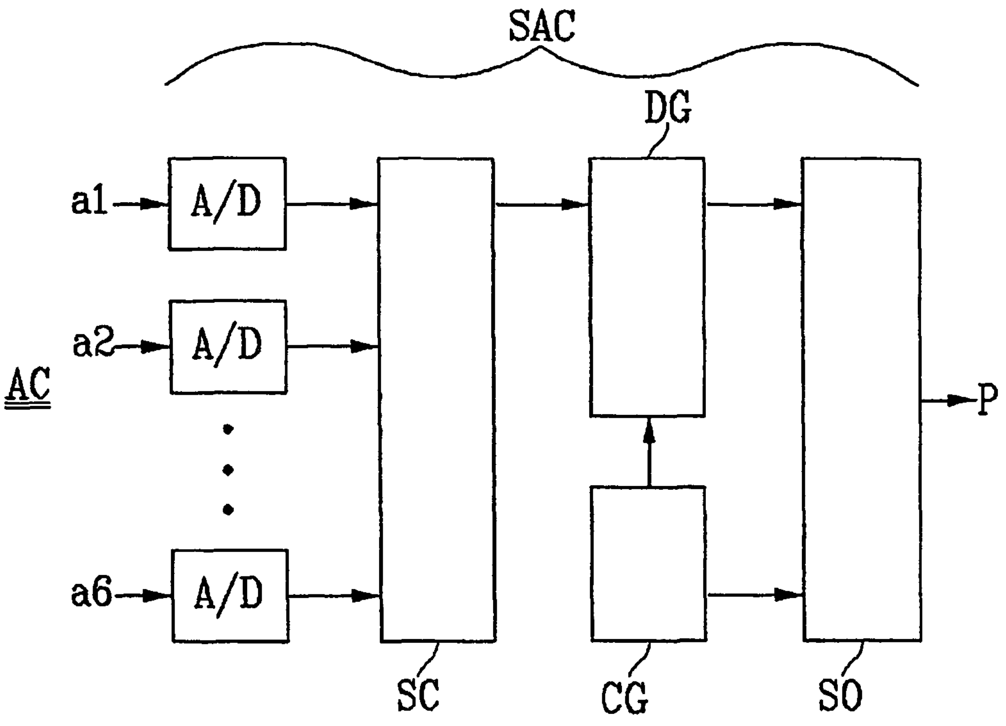
FIG. 4 is a block diagram of a circuit that is applied to a circuit of a main audio body in order to realize the multi-channel speaker system and the wiring device according to the embodiment of the present invention.
Figure 5:
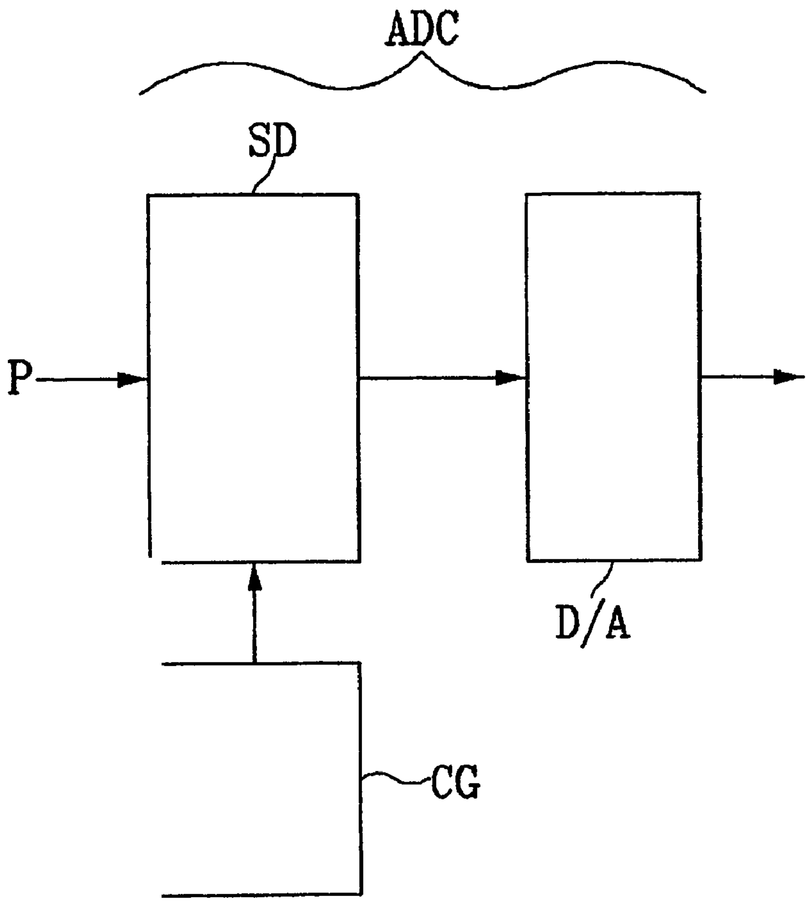
FIG. 5 is a block diagram of an auxiliary circuit that is applied to a circuit of a speaker in order to realize the multi-channel speaker system and the wiring device according to the embodiment of the present invention.

FIG. 2 is a block diagram showing a multi-channel speaker system and a wiring device thereof according to an embodiment of the present invention; FIG. 3 is a block diagram showing another example of a multi-channel speaker system and a wiring device thereof according to an embodiment of the present invention; FIG. 4 is a block diagram of a circuit that is applied to a circuit of a main audio body in order to realize the multi-channel speaker system and the wiring device according to the embodiment of the present invention; FIG. 5 is a block diagram of an auxiliary circuit that is applied to a circuit of a speaker in order to realize the multi-channel speaker system and the wiring device according to the embodiment of the present invention; and FIGS. 6A, 6B, and 6C show examples of a method for realizing the wiring device for the multi-channel speaker system according to the embodiment of the present invention.

As shown in the drawings, the wiring device for the multi-channel speaker system according to the embodiment of the present invention is realized by adding a serial audio signal circuit SAC generating a serial digital audio signal to a circuit AC of a main audio body A, and by adding an audio signal separating circuit ADC to an amplification circuit or a rectification circuit of each of a center speaker CS, a woofer W, a front right speaker FR, a front left speaker FL, a rear right speaker RR, and a rear left speaker RL.

Figure 6A:
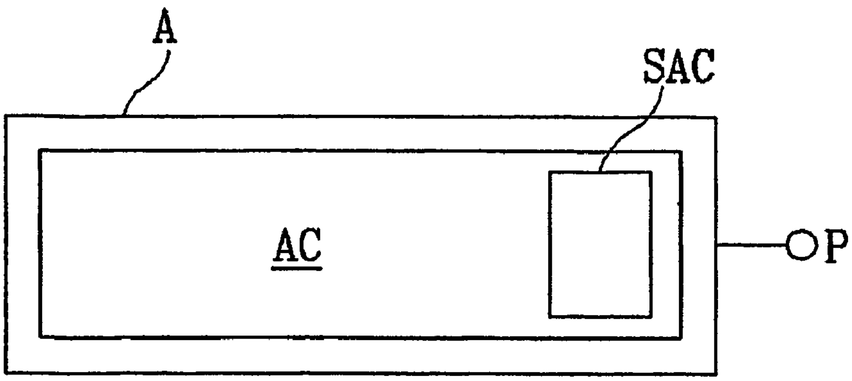
FIGS. 6A, 6B, and 6C show examples of a method for realizing the wiring device for the multi-channel speaker system according to the embodiment of the present invention.
Figure 6B:
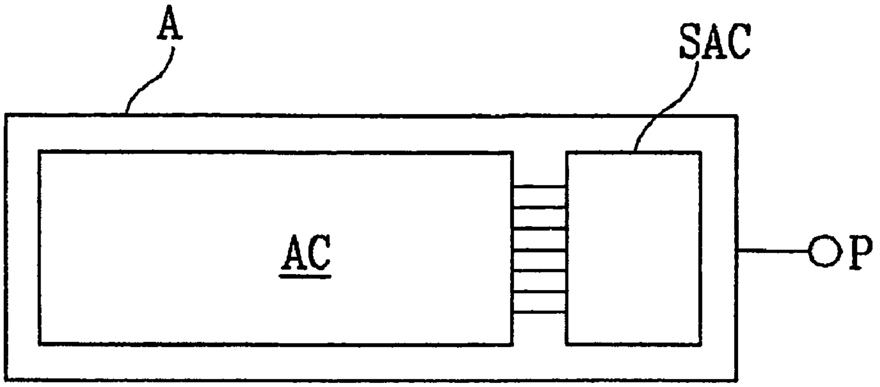
Figure 6C:
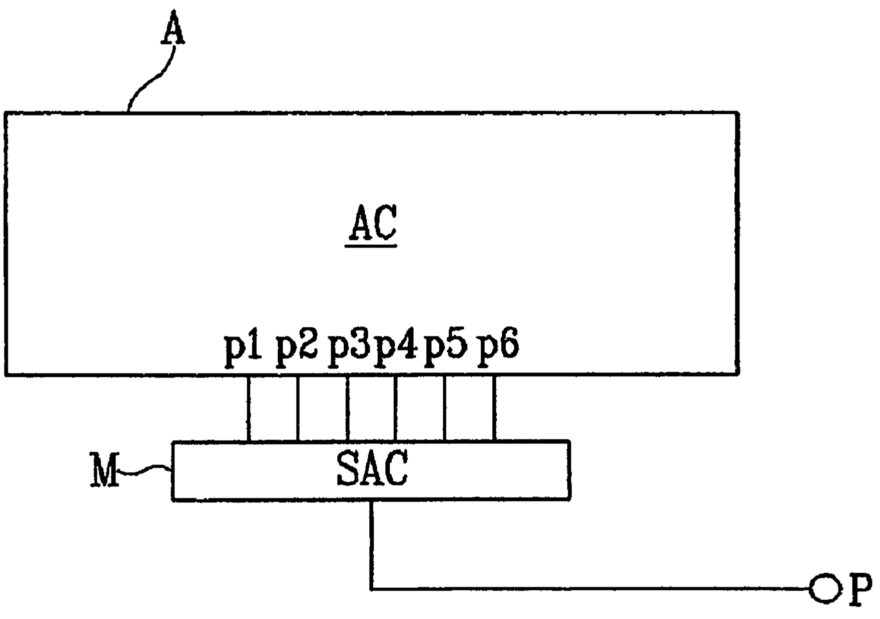

The serial audio signal circuit SAC that is provided in the circuit AC of the main audio body A and generates the serial digital audio signal, as shown in FIGS. 6A, 6B, and 6C, can be formed integrally with a printed circuit board PCB forming the circuit AC of the main audio body A (FIG. 6A), can be formed as a separate print circuit board PCB and mounted to the main audio body A (FIG. 6B), or can be formed as a connection member M in the form of a unit such as a separate box-type unit and mounted to the main audio body (FIG. 6C).

Therefore, the multi-channel speaker system and the wiring device thereof can be easily applied to a prior audio system.

The audio signal driving circuit ADC that is mounted additionally to the amplification circuit or the rectification circuit of the center speaker CS, the woofer W, the front right speaker FR, the front left speaker FL, the rear right speaker RR, and the rear left speaker RL can be incorporated within the speaker or can be formed as a separate connection box to be directly applied to the prior speaker system.

Hereinafter, referring to FIGS. 4 and 5, the serial audio signal circuit SAC and the audio signal separating circuit ADC will be explained in detail.

Although the serial audio signal circuit SAC and the audio signal separating circuit ADC are shown in the block diagram, various equivalent circuits or software can be obtained by an ordinarily skilled person in the art, and such equivalent circuits or software will still fall within the spirit and scope of the present invention.

The serial audio signal circuit SAC is a circuit that can also be realized on a circuit board.

Analog audio signals a1, a2, a3, a4, a5, and a6 that are generated in the circuit AC of the main audio body A are input into an analog/digital converter A/D of the serial audio signal circuit SAC. When the serial audio signal circuit SAC is formed as a device separate from the main audio body A, the analog signals a1, a2, a3, a4, a5, and a6 are input into the analog/digital converter A/D through conventional audio output terminals p1, p2, p3, p4, p5, and p6.

The analog/digital converter A/D converts each of the analog signals a1, a2, a3, a4, a5, and a6 to digital audio signals. The converted digital audio signals are synthesized as a single digital signal by a multi-channel control signal synthesizer SC.

The single digital audio signal is synchronized with reference to reference clocks that are generated for each digital audio signal by a clock generator of a digital signal synthesizer DG.

The digital signal synchronized by the digital signal synthesizer DG is converted to a serial digital audio signal by a serial signal output member SO, and is then outputted to the speaker through an output wire P. If necessary, amplification by the serial signal output member SO can be performed.

The audio signal separating circuit ADC that is provided in each of the center speaker CS, the woofer W, the front right speaker FR, the front left speaker FL, the rear right speaker RR, and the rear left speaker RL separates a digital signal that is replayed in the corresponding speaker from the serial digital audio signal that is input through the wire P, using a multi-channel separator SD. For example, the serial digital audio signal includes inherent number information corresponding to each of the speakers, and the multi-channel separator SD can separate digital signals corresponding to each speaker from the serial digital audio signal.

The digital signal that is separated in each speaker is converted to an analog signal. If necessary, the analog signal is amplified and is then output.

Because the single digital audio signal is synchronized by the reference clock of each channel, the corresponding signal can be separated by the corresponding speaker generating the corresponding reference clock.

Therefore, any one of the center speaker CS, the woofer W, the front right speaker FR, the front left speaker FL, the rear right speaker RR, and the rear left speaker RL can be connected firstly, and the speakers can be wired by any arbitrary sequence and method.

That is, as shown in FIG. 2, the multi-channel speaker system and a wiring device thereof use the single output wire P and two parallel wires P1 and P2. The center speaker CS, the front left speaker FL, and the rear left speaker RL are connected to the wire P1, and the woofer W, the front right speaker FR, and the rear right speaker RR are connected to the wire P2. Each speaker can separate a digital signal corresponding to the reference clock generated by itself from the input digital audio signals having all channels, and thereby revive a perfect sound.

Further, as shown in FIG. 3, when all the speakers are connected by a single wire P, the same result can be obtained.

Therefore, it is not necessary to connect each speaker to a corresponding audio terminal.

According to the multi-channel speaker system and the wiring device thereof according to the embodiment of the present invention, all speakers can be connected by a single wire, so that wiring becomes very simple and spoiling the beauty of the room by the exposure of the wires can be prevented, and furthermore, a deterioration of the output power of the audio system due to an increase of the impedance by a plurality of wires can be prevented.

In addition, a further advantage of the multi-channel speaker system and the wiring device according to the embodiment of the present invention is to provide easy wiring of the multi-channel speaker system, and easy disassembly of the same.

What is claimed is:

1. A wiring device of a multi-channel speaker system that operates a plurality of speakers with different sound range signal values by connecting a main audio body and the plurality of speakers, comprising:

a serial audio signal circuit SAC; and audio signal separating circuits ADC that are provided in each of the plurality of speakers, wherein the serial audio signal circuit SAC comprises:

an analog/digital converter A/D for converting a plurality of analog signals that are generated by the main audio body to digital signals, a multi-channel control signal synthesizer SC for synthesizing the plurality of digital signals into a single digital audio signal, a clock generator CG for providing a reference clock to the synthesized digital audio signal, a digital signal synthesizer DG for synchronizing each of the digital audio signals according to the reference clock generated by the clock generator, a serial signal output member SO for converting the synchronized digital audio signal to a serial digital audio signal and outputting the serial digital audio signal, and a single wire extended from the serial signal output member SO; and wherein the audio signal separating circuit ADC comprises:

a multi-channel separator for separating a digital signal corresponding to the reference clock generated by the clock generator CG from the input serial digital audio signal, and a digital/analog converter D/A for converting the separated digital signal to an analog signal.

2. The wiring device of claim 1, wherein the plurality of speakers are connected to the serial signal output member SO through at least two parallel wires or a single wire.

3. The wiring device of claim 1, wherein the serial audio signal circuit SAC is provided within the main audio body A, and the audio signal separating circuits ADC are provided within each of the plurality of speakers.

4. The wiring device of claim 1, wherein the serial audio signal circuit SAC is formed as a unit separate from the main audio body A and is mounted to the main audio body, and the audio signal separating circuits ADC are formed as a unit separate from the speakers and are mounted to the speakers.

5. A multi-channel speaker system comprising:

a plurality of speakers;

a main audio body with an analog audio signal generating circuit that is configured to generate a plurality of analog signals for operating the plurality of speakers;

a serial audio signal circuit configured to generate a single serial digital audio signal by synthesizing the plurality of analog signals that are generated by the analog audio signal generating circuit; and a plurality of audio signal separating circuits, a number of which corresponds to a number of the plurality of speakers, the audio signal separating circuit receiving the serial digital audio signal generated by the serial audio signal circuit and separating a corresponding digital signal, and the audio signal separating circuit converting the separated digital signal to an analog signal, wherein the serial audio signal circuit comprises an analog/digital converter for receiving the plurality of analog signals from the audio signal generating circuit and converting the analog signals respectively to digital signals, a multi-channel control signal synthesizer for synthesizing the digital signals into a single digital signal, a clock generator for providing a respective reference clock for the synthesized digital signal, a digital signal synthesizer for synchronizing each of the digital signals in response to the reference clock generated by the clock generator, and a serial signal outputting member for converting the synchronized digital signal to a serial digital audio signal, and wherein the audio signal separating circuit comprises a multi-channel separator SD for separating a digital signal corresponding to the respective speaker from the serial digital audio signal input through a wire, and a digital/analog converter for converting the separated digital signal to an analog signal.

6. The multi-channel speaker system of claim 5, wherein the plurality of speakers are connected to the serial digital signal generator through at least two parallel wires or a single wire.

7. The multi-channel speaker system of claim 5, wherein the serial audio signal circuit is provided within the main audio body A, and the audio signal separating circuit is provided within each of the speakers.

8. The multi-channel speaker system of claim 5, wherein the serial audio circuit is formed as a unit separate from the main audio body and is mounted to the main audio body, and wherein the audio signal separating circuits are formed as a unit separate from the speakers and are mounted to the speakers.

* * * * *